(No Model.)
C. R. WATROUS & J. S. PALMER.
ANIMAL TRAP.
No. 471,726. Patented Mar. 29, 1892.
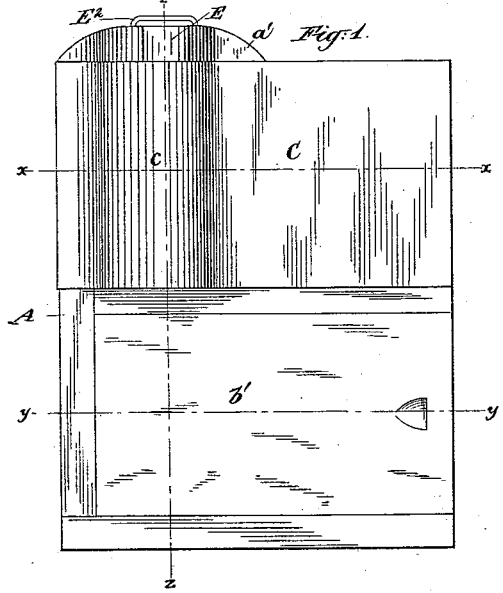
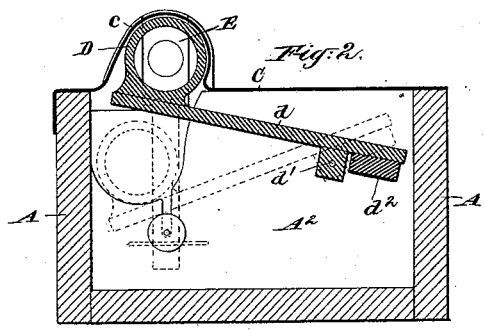
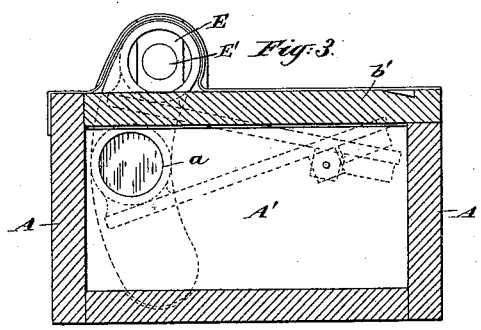
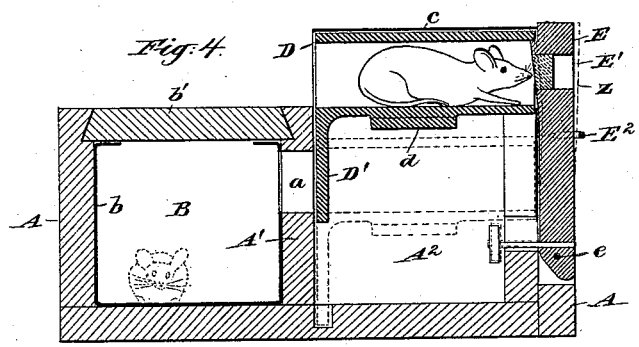
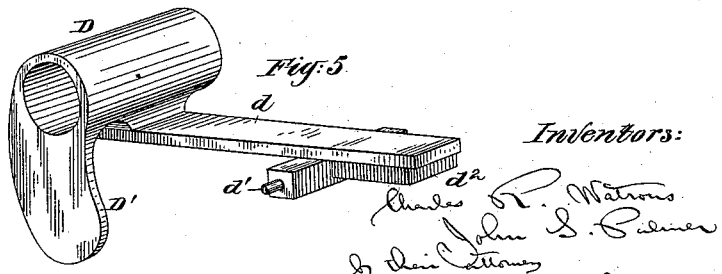
Witnesses:
Charles R. Searle.
M. F. Boyles.
Inventors:
Charles R. Watrous
John S. Palmer
By their Attorney
Thomas Speer Stetson

UNITED STATES PATENT OFFICE.

CHARLES R. WATROUS, OF OLD MYSTIC, AND JOHN S. PALMER, OF LITCHFIELD, CONNECTICUT.

ANIMAL-TRAP.

SPECIFICATION forming part of Letters Patent No. 471,726, dated March 29, 1892.

Application filed July 20, 1891. Serial No. 400,050. (No model.)

*To all whom it may concern:*

Be it known that we, CHARLES R. WATROUS, of Old Mystic, in the county of New London and State of Connecticut, and JOHN S. PALMER, of Litchfield, in the county of Litchfield and State of Connecticut, have invented a certain new and useful Improvement in Animal-Traps, of which the following is a specification.

This invention relates to that class of traps where it is intended to secure the animal alive and without injury; and it consists, essentially, in an open-ended, pivoted, and counterbalanced chamber, into which the animal will go, held in its normal position by a catch which carries the bait and adapted to fall by the weight of the animal when he attacks the bait, combined in a suitable case with a larger chamber having an opening communicating with said movable chamber when the latter is at its lowest position. When the animal passes into this larger chamber, the counterweight causes the pivoted chamber to move up to its first position, re-engaging the catch and effectually caging the animal by closing the opening between the two chambers.

For more complete comprehension of the construction and operation of our invention, reference must be had to the accompanying drawings, forming part of this specification.

Figure 1 represents a plan view of our trap; Fig. 2, a corresponding section taken through the case and counterbalanced chamber on the line $x$ $x$, the latter being shown in its normal or "ready" position; and Fig. 3, a similar view taken through the larger chamber on the line $y$ $y$. Fig. 4 is a longitudinal section of the entire trap, taken on line $z$ $z$ in Fig. 1; and Fig. 5, a perspective view of the counterbalanced chamber detached.

Similar letters of reference indicate corresponding parts in all the figures where they appear.

A is the case or body of the trap, formed partly of wood and partly of metal, or papier-maché, or other similar material or combination of materials, preferably of rectangular configuration, and of such dimensions as will be best adapted to the size of the animals to be caught.

The case is divided by a partition A' into two compartments $A^2$ and B, said partition having an aperture $a$ near the top, as seen in Figs. 3 and 4, large enough to allow the animal to pass through. When the case is of wood, the chamber B preferably has a removable metal lining $b$ to admit of cleaning, and a sliding cover $b'$ either at the top, as shown, or at one of the sides. The roof or cover C of the compartment $A^2$ is preferably of sheet metal and has a raised portion $c$ prolonged to the full width of the cover, so as to form a chamber, open at one end, of such size and shape in cross-section as will readily permit a movable chamber D to rise within the same out of the compartment $A^2$, so as to bring its open end wholly above the flat part of the roof C. This chamber D is usually, but not necessarily, cylindrical, and is carried on the end of a bar $d$, which is provided with pivot-points $d'$ for engagement with bearings in the partition A' and outer wall of the compartment $A^2$. This bar also has a counter-weight $d^2$ upon the end opposite to the chamber D heavy enough to keep said chamber normally well up in the raised portion $c$ and to quickly return same to that position after it has been depressed. D' is a shield or closure depending from the front end of this movable chamber a sufficient distance to cover the aperture $a$ in the partition A' when the chamber is in its upward or normal position.

$a'$ is an extension of the case A, covering the outer end of the dome $c$ and slotted vertically to receive a vertical catch E, which is pivoted at $e$ within said slot and weighted and set so that its free upper end will engage automatically with the rim of the chamber D, as shown in Fig. 4, and thus hold the same in the upward or "ready" position.

E' is a recess made in the inner face of the catch about opposite the center of the movable chamber to receive the bait Z, which is forced tightly therein and left with a smooth face presented inward, so as to require effort on the part of the animal attacking it sufficient to force the catch outward and free the chamber. We have shown the recess E' as a hole extending quite through the catch.

$E^2$ is a retaining wire or stop preventing unnecessary outward movement of the catch, but capable of being removed temporarily when rebaiting the trap, which is done by swinging the catch E outward.

The operation of our improved trap can be understood from the foregoing and from the drawings; but we may further explain that the animal enters the movable chamber D and attacks the bait Z and forces the catch E out of engagement, when the weight of the animal overcomes the counter-weight $d^2$ and causes the chamber and forward part of the bar $d$ to swing downward upon the pivots $d'$ to a point within the compartment $A^2$ sufficiently low to bring the open end of the movable chamber opposite the aperture $a$ in the partition $A'$, through which the animal will naturally escape backward into the larger chamber B. Directly he arrives there the chamber D will of course be clear, and the counter-weight immediately brings it back to the first position with the shield $D^2$ closing the aperture $a$ and effectually caging the animal. A number may thus be caught before the cover $b'$ need be opened.

This trap allows the animal to reach the bait before any part of the mechanism commences to move—that is to say, the animal is entirely on the drop formed by the movable chamber D before the tripping motion acts. We esteem this an important advantage due to the invention.

Various modifications may be made in the details of construction of our animal-trap without departing from the principles or sacrificing the advantages of our invention.

The cover $b'$ may be made so as to exclude light, or partly of wire, so as to admit viewing the interior.

We claim as our invention—

1. In an animal-trap, a pivoted platform having a counter-weight thereon at one end and a tubular enlargement at its opposite end, a closure depending beneath the same, and adjoining chambers with which said parts permit ingress and egress, substantially as described.

2. An animal-trap comprising two adjacent chambers, communicating openings therein, a pivoted platform located in one of said chambers and having a counter-weight upon one arm thereof, a tubular enlargement on its opposite end forming the entrance to the trap, and an elongated closure depending from the under side of said platform for closing the exit from the trap to the cage.

CHARLES R. WATROUS.
JOHN S. PALMER.

Witnesses to signature of Charles R. Watrous:
JABEZ WATROUS,
J. WATROUS, Jr.

Witnesses to signature of John S. Palmer:
M. F. BOYLE,
CHARLES R. SEARLE.